(12) United States Patent
Nemirovski

(10) Patent No.: US 6,647,368 B2
(45) Date of Patent: *Nov. 11, 2003

(54) SENSOR PAIR FOR DETECTING CHANGES WITHIN A HUMAN EAR AND PRODUCING A SIGNAL CORRESPONDING TO THOUGHT, MOVEMENT, BIOLOGICAL FUNCTION AND/OR SPEECH

(75) Inventor: Guerman G. Nemirovski, St. Petersburg, FL (US)

(73) Assignee: Think-A-Move, Ltd., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/897,696

(22) Filed: Jul. 2, 2001

(65) Prior Publication Data

US 2002/0143242 A1 Oct. 3, 2002

Related U.S. Application Data

(60) Provisional application No. 60/280,282, filed on Mar. 30, 2001.

(51) Int. Cl.$^7$ .............................. G10L 15/08; A61B 5/00
(52) U.S. Cl. ...................... 704/270; 704/271; 704/275; 600/300
(58) Field of Search .............................. 704/270, 271, 704/275

(56) References Cited

U.S. PATENT DOCUMENTS

| | | |
|---|---|---|
| 3,870,034 A | 3/1975 | James |
| 4,064,870 A | 12/1977 | Dumitrescu et al. |
| 4,429,702 A | 2/1984 | von Recklinghausen |
| 4,533,795 A | 8/1985 | Baumhauer, Jr. et al. |
| 4,652,702 A | 3/1987 | Yoshii |
| 4,922,471 A | 5/1990 | Kuehnel |
| 4,930,156 A | 5/1990 | Norris |
| 5,149,104 A | 9/1992 | Edelstein |

(List continued on next page.)

FOREIGN PATENT DOCUMENTS

| | | |
|---|---|---|
| CH | 678692 A5 | 10/1991 |
| EP | 0 501 058 A2 | 9/1992 |
| EP | 0 767 417 A1 | 4/1997 |
| GB | 2234882 | 2/1991 |
| WO | WO 97/09927 | 3/1997 |
| WO | WO 00/03639 | 1/2000 |
| WO | WO 00/69215 | 11/2000 |
| WO | WO 01/39662 | 6/2001 |

OTHER PUBLICATIONS

Claims from Ser. No. 09/919,291; filed Jul. 31, 2001.
Claims from Ser. No. 09/706,091; filed Nov. 3, 2000, and as amended May 7, 2002.

(List continued on next page.)

Primary Examiner—Tālivaldis Ivars Šmits
(74) Attorney, Agent, or Firm—Renner, Otto, Boisselle & Sklar LLP

(57) ABSTRACT

A pair of sensors are used for detecting an air pressure change signal within an ear of a person caused by the person's initiating action (thought, movement, biological function and/or speech). One of the microphones is placed at least partially within an ear of the person and the other is placed adjacent to and external to the ear, to produce two electrical signals, respectively corresponding to internally detected and to externally detected changes in air pressure. Comparison of the unmodified signal strength difference between these two signals is used to distinguish an initiating action component of each signal from an external source component of each signal. The electrical signals are processed to produce an output signal corresponding to the initiating action, which signal is then recognized by a neural network or speech recognizer, and used for control or communication.

20 Claims, 8 Drawing Sheets

U.S. PATENT DOCUMENTS

| | | | |
|---|---|---|---|
| 5,164,984 A | | 11/1992 | Suhami et al. ............... 379/444 |
| 5,280,524 A | | 1/1994 | Norris |
| 5,363,444 A | | 11/1994 | Norris |
| 5,373,555 A | | 12/1994 | Norris et al. |
| 5,448,637 A | * | 9/1995 | Yamaguchi et al. ......... 379/430 |
| 5,474,082 A | * | 12/1995 | Junker ......................... 600/545 |
| 5,606,607 A | * | 2/1997 | Yamaguchi et al. ......... 379/430 |
| 5,638,826 A | | 6/1997 | Wolpaw et al. |
| 5,659,156 A | | 8/1997 | Mauney et al. |
| 5,664,014 A | * | 9/1997 | Yamaguchi et al. ......... 379/430 |
| 5,676,138 A | | 10/1997 | Zawilinski |
| 5,692,517 A | * | 12/1997 | Junker ......................... 600/545 |
| 5,734,713 A | | 3/1998 | Mauney et al. |
| 5,740,258 A | | 4/1998 | Goodwin-Johansson |
| 5,812,659 A | | 9/1998 | Mauney et al. |
| 5,812,978 A | | 9/1998 | Nolan |
| 5,844,984 A | * | 12/1998 | Yamaguchi et al. ......... 379/430 |
| 5,878,396 A | | 3/1999 | Henton |
| 5,881,159 A | | 3/1999 | Aceti et al. |
| 5,896,451 A | | 4/1999 | Deas |
| 6,022,311 A | | 2/2000 | Juneau et al. |
| 6,024,700 A | | 2/2000 | Nemirovski et al. |
| 6,072,884 A | | 6/2000 | Kates ........................... 381/318 |
| 6,156,585 A | | 12/2000 | Gogoi et al. |
| 6,175,633 B1 | | 1/2001 | Morrill et al. |
| 6,283,915 B1 | | 9/2001 | Aceti et al. |

OTHER PUBLICATIONS

Sound Radio Products™ Better Living Through Wireless Technology, printed Oct. 29, 2001 from Internet Website http://www.soundradio.com/en–921.html.

*Archives of Physical Medicine and Rehabilitation,* "Answering Questions With an Electroencephalogram–Based Brain–Computer Interface," by Laurie A. Miner, MS, PT, et al.; taken from the Internet at http://www.archives–pmr.prg/abs79__9/v9n9p029.html and http://silk.nig.gov/silk/ncmrr/abstract/absJRW1.htm. 3 pages.

*Devices Read Brain Waves,* "They help paralyzed communicate," by Robert S. Boyd, taken from the Internet at http://www.freep.com/tech/qthink25.htm, 4 pages.

"Discover the Cyberlink™ Mind Mouse!," Reprinted from the Internet at http://www.mindmouse.com, Dec. 4, 1998, 1 page.

"The Cyberlink™ Mind Mouse," Reprinted from the Internet at http://www.mindmouse.com\Business\bat.hem, Dec. 4, 1998, 2 pages.

*The Other 90%,* "The MindDrive Thought Response Technology," taken from the Internet at http://www.other90.com/new/htm/whitepage.htm, Jul. 9, 1998, 2 pages.

"Brain Actuated Technologies," Reprinted from the Internet at http://www.mindmouse.com/Business/Bat.htm, Dec. 4, 1998, 2 pages.

*Detection of Sensorineural Hearing Impairment By Using DPOAE Technique and Classifiers,* A. Nevcihan, et al., 1995 IEEE–EMBC and CMBEC, Theme 4: Signal Processing, 0–7803–2475–7/97.

International Search Report for corresponding International Patent Application No. PCT/US02/10176.

Claims from Serial No. 09/919,291; Filed Jul. 31, 2001.

Claims from Serial No. 09/706,091; Filed Nov. 3, 2000, and as amended May 7, 2002.

* cited by examiner

SENSOR PAIR FOR DETECTING CHANGES WITHIN A HUMAN EAR AND PRODUCING A SIGNAL CORRESPONDING TO THOUGHT, MOVEMENT, BIOLOGICAL FUNCTION AND/OR SPEECH

RELATED APPLICATION(S)

This application claims the benefit of U.S. Provisional Application No. 60/280,282, filed Mar. 30, 2001, the entire disclosure of which is incorporated herein by reference.

FIELD OF THE INVENTION

The present invention generally relates to a sensor placed with respect to an ear. More particularly, the sensor is used to detect physical or mental actions of a person such as speech, thoughts, movements of the tongue with respect to the oral cavity, biological functions, etc. and provides an output which can be converted into system control functions.

BACKGROUND OF THE INVENTION

An apparatus and method for detecting thoughts is disclosed in U.S. Pat. No. 6,024,700, the entire disclosure of which is incorporated by reference. The thought may lead to a detectable air pressure or sound at one or both ears of a user which can be detected by a detector, such as a microphone. Exemplary outputs from such system and method for detecting thoughts may be one or plural discrete outputs, such as discrete outputs representing respective alphanumeric characters, directions, etc.

An apparatus and method for detecting physical action, such as mouth and tongue movement, is disclosed in U.S. patent application Ser. No. 09/706,091, filed Nov. 3, 2000, the entire disclosure of which is incorporated by reference. The physical action leads to a detectable air pressure or sound at one or both ears of a user.

Sounds produced by a person's ears sometimes are referred to as autoaccoustic. Autoaccoustic sounds have been used in the past for diagnostics, e.g., to indicate ear function or a condition of the ear. For example, in response to a sound input to the ear, the ear has been found to provide a detectable autoaccoustic output.

At present there are available controllers to enable a handicapped person, who cannot use arms or legs, to operate a motorized wheelchair. Such a controller includes a trackball or joystick type device that is inserted into the mouth of an individual; and the individual operates the controller using mouth and/or tongue movements to provide mechanical inputs. Such device is difficult to operate and is problematic if it falls from the mouth or irritates the mouth.

Other controllers exist to enable handicapped individuals to perform functions with mechanical assists. Operation of such controllers typically requires a signal, such as an incident electromagnetic signal, e.g., infrared or ultraviolet light/radiation, which is directed at the individual; then, by a specified action or activity the individual can modulate the incident electromagnetic signal, e.g., by blinking the eyes, moving the head, or some such action. The need for incident electromagnetic signal is disadvantageous for several reasons: an extra piece of equipment is required to provide that signal, the signal must be properly directed or aligned, the detector and the modulated signal must be properly aligned, the signal should not have a detrimental affect on the user (such as causing eye injury), etc.

At present there are available voice recognition software programs which receive an input signal representative of human speech and convert that signal into text format or carry out a command upon interpreting the speech. The input signal is generated by a microphone disposed in front of the speaker's mouth.

SUMMARY OF THE INVENTION

According to one aspect of the invention, the invention is a method of detecting an air pressure change within an ear of a person. The method includes steps of placing a microphone at least partially within an ear of the person; detecting the change in air pressure within the ear of the person using the microphone, the change in air pressure corresponding to an initiating action made by person; producing an electrical signal corresponding to the internally detected change in air pressure; and processing the electrical signal to produce a corresponding output.

According to another aspect of the invention, the invention is a detection system. The detection system includes a housing positionable with respect to an ear of a person; a microphone disposed with respect to the housing for at least partial insertion into the ear of a person, the microphone operable to detect a change in air pressure within the ear while the person makes an initiating action and to produce an electrical signal corresponding to the internally detected change in air pressure; and processing circuitry coupled to the microphone for processing the electrical signal to produce a corresponding output.

According to yet another aspect of the invention, the invention is a sensor for detecting changes in air pressure in a human ear. The sensor includes a housing having an interior portion adapted for at least partial insertion into the ear of a person and an external portion adapted to engage at least a portion of a pinna of the ear; an internal microphone dispose with respect to the interior portion of the housing to detect air pressure changes emanating from within the ear; and an exterior microphone dispose with respect to the exterior portion of the housing to detect air pressure changes emanating externally to the ear.

DETAILED DESCRIPTION OF THE INVENTION

Figure 1A:
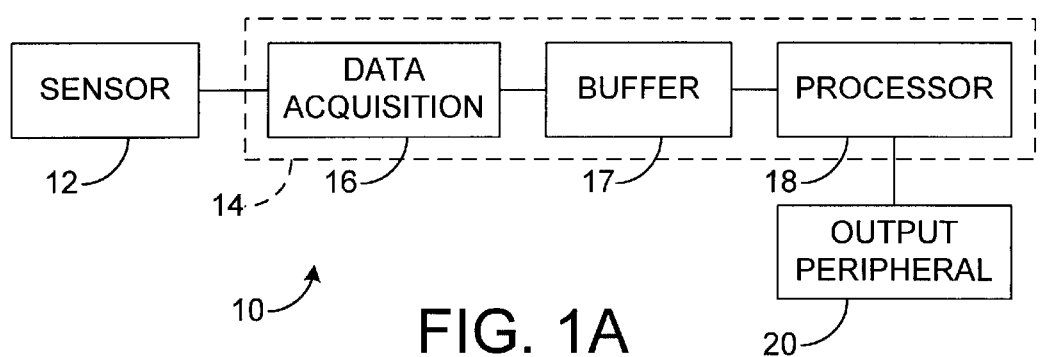
FIG. 1A is a block level diagram illustrating a system by which air pressure fluctuations are detected and used to provide a control function which corresponds to the detected air pressure according to the present invention.

The following is a detailed description of the present invention made in conjunction with the attached figures, wherein like reference numerals will refer to like elements throughout. To illustrate the present invention in a clear and concise manner, the drawings may not necessarily be to scale and certain features may be shown in somewhat schematic form.

The present invention is directed to apparatus and method for detecting physical and/or mental actions of a person (such as actions occurring in association with the thoughts of the person, the speech of the person and/or movements associated with the oral cavity) by monitoring air pressure changes in or near a person's ear over a period of time. As an example, motion of the tongue in the oral cavity can be detected or sensed to provide a useful output. As another example, the action can be mental, as in thinking a thought, which produces a detectable air pressure change within and/or adjacent the ear as discussed in greater detail in U.S. Pat. No. 6,024,700. More specifically, the thought causes a reaction in the human anatomy which effectuates a change in the ear (perhaps by muscle contraction), thereby producing a detectable change in air pressure in or near the ear canal. An exemplary output may contain information analogous to an information signal produced by a computer mouse, the click buttons on the mouse, a computer joystick, or the like.

The present invention has been found to be more aesthetically pleasing and comfortable to the user and detects less environmental, or ambient, noise than the systems disclosed in the above-mentioned U.S. Pat. No. 6,024,700 and in U.S. patent application Ser. No. 09/706,091. As will be described in more detail below, the sensor of the present invention includes a microphone disposed with respect to an ear of a user and detects air pressure changes within the ear. This microphone will be referred to herein as an internal microphone. The air pressure changes may be caused by one or more factors, including vibrations of the ear drum, vibrations of bone within the ear, vibrations of other anatomical structures within the ear and vibrations conducted by the bones and/or tissue of the user to the ear and which invoke an air pressure change in the ear. As a result, the sensor can be used to detect a person's speech. The term speech, as used herein, is intended to include spoken words and utterances, singing and other vocalizations produced by a person. Such detected speech can be used for many purposes including, for example, processing the detected speech with voice recognition software or re-transmitting the detected speech with a communications device such as a cellular telephone (thereby allowing separation of the speech input device from the RF transceiver).

In addition to the internal microphone, the present invention can also include an external microphone. The external microphone detects air pressure changes, or sounds, originating outside the user's ear. As described below in more detail, these sounds are converted into electrical signals and compared with electrical signals corresponding to the sounds detected by the internal microphone. The respective signals can be processed to discern air pressure changes within the ear from externally produced ambient noise, speech and the like.

The present invention can also be used as a medical diagnostic tool by detecting and monitoring various biological processes, including a person's heartbeat, breathing and gastronomical events, which cause detectable changes in air pressure in or near the ear. Therefore, by monitoring air pressure adjacent or within the ear, a person's heartbeat, breathing and any irregularities associated therewith can be studied. The sounds detected by the sensor of the present invention can be amplified to a level to be studied by medical personnel and/or processed by a device programmed to analyze such biological functions.

The present invention is able to provide an output having a continuity characteristic, e.g., similar to the signal produced by moving a computer mouse along a surface. The electrical signal produced by the sensor can contain discernable information which was generated by two or three dimensional movements of certain body parts, particularly movements of the tongue, jaw, and oral and nasal cavities. The resulting signal output from the sensor is analogous to the signal produced by a computer joystick that has up, down, left, right, front and back signal outputs. Intensity or other components of the signal can be used as a measure of the action's speed characteristics.

By measuring air pressure in both ears with separate sensors, at least two electrical signals can be produced and processed, resulting in a two dimensional (or stereophonic) information pattern. The information derived from each sensor, along with similarities and differences in the data streams, can be used to discern additional information from the person. In some cases, the additional information will improve the generation of control commands, detection of thoughts, recognition of speech, detection of biological processes and other functions of the systems described herein.

The invention may be used for many additional purposes. One exemplary use is to provide an input to a computer or to some other electrical or electronic device. An exemplary input is an electrical signal, but it will be appreciated that the signal generated by the sensor used to detect air pressure changes may be other than electrical, or an electrical signal generated by the sensor can be converted into a form which is not electrical. Example alternative signal types include, for example, an optical signal, a fluidic signal, a radio frequency (RF) signal, etc. The input may control the computer or other device or it may be used for some other purpose. To facilitate and to avoid complexity of the description of the invention herein, the invention is described with respect to a use to provide an electrical input to a computer, for example, a personal computer or some other computer, whether of the digital or analog type, to control the operation of the computer. It will be appreciated that the invention may be used for many other purposes.

One example of a use of the invention in combination with a computer which is controlled using the invention is to provide functions and capabilities for a handicapped person. For example, the invention may be used to enable a handicapped individual or a non-handicapped individual to control operation of a piece of machinery in a manufacturing facility, to control operation of a motorized wheelchair or similar device, to control operation of a video game, etc. These are only examples, and it will be appreciated that the invention may be used for many other purposes.

In the present invention there is no need for the individual to be subjected to a stimulus signal, such as an incident acoustic or electromagnetic signal. Rather, in the present invention, actions of the individual (e.g., a tongue movement involving clicking of the tongue against the teeth or pallet) are used to create air pressure or sounds at one or both ears of the individual, which can be detected or sensed and used as an output of the invention to be provided as an input to a computer or to some other device. Thus, the present invention presents an unstimulated signal, namely a signal that is produced by action of the individual without the need for a stimulus to be directed at the individual.

In accordance with an embodiment of the invention a sensor senses or detects air pressure, a change in air pressure or a sound that is produced by an ear of an individual. These pressure changes may be produced by the person's ear drum or other anatomical structure within the ear. In addition, the pressure changes may originate in other parts of the person's body and conducted to the ear by bone or tissue where a vibration or air pressure change is produced and detected by the sensor.

To facilitate the description herein, the event of sensing or detecting will be referred to as detecting and that which is detected will be referred to as a change within the ear. Also, to facilitate the description herein, the action causing the detectable change will be described as an "initiating action." The initiating action can be one or more physical or mental actions, including, but not limited to, thinking a thought, speaking, movement of the tongue in the oral cavity (sometimes referred to as "tongue action"), other movements or actions in or associated with the oral or nasal cavities, clicking or other actions of the tongue against the teeth or pallet, exhaling or inhaling by the lungs, beating of the heart and actions of the nose. As an example, tongue movements lead to the detectable air pressure. These movements can be two dimensional (e.g., up/down, left/right, in/out, etc.) or three dimensional (any combination of front and back, left and right and up and down) which generate a corresponding output by the sensor, even if that output is one dimensional in the case of one sensor or two dimensional in the case of two sensors (one for each ear).

The present invention monitors changes within the human ear which occur instantaneously, or nearly instantaneously, in response to the initiating action to provide a substantially real-time detection and control system. In addition, the monitoring of the changes is passive and thus avoids potential health and/or environmental concerns related to subjecting the body to electrical signals and/or radiation. Furthermore, the changes in the ear uniquely correspond to one of a variety of initiating actions (e.g., have unique signal signatures) which allows a plurality of different initiating actions to be detected and distinguished for a system requiring multiple control functions.

According to one aspect of the present invention, the sensor is in electrical communication with processing circuitry and senses changes of the ear and converts the sensed changes into an electrical signal. The electrical signal is then processed to provide a control instruction or some other useful output, such as an output similar to that produced by a computer mouse or joystick which corresponds to the particular initiating action. Exemplary control functions may include, but are not limited to: controlling a video game display, controlling a piece of medical equipment such as a wheelchair, and controlling computer functions to effectuate a handless mouse, keyboard, joystick, etc.

Turning now to the figures, FIG. 1A is a block level diagram which illustrates a system 10 for detecting initiating actions and providing an output which corresponds to the detected action. The system 10 includes a sensor 12 coupled to processing circuitry 14. The sensor 12 includes an internal ear microphone as described in more detail below. The sensor 12 detects changes within the ear that result from an initiating action by the person wearing the sensor 12. The processing circuitry 14 includes a data acquisition circuit 16, such as a computer sound card. Other example data acquisition circuits include a PCI9118HG data acquisition card manufactured by Adlink Technology or a DAQi250 data acquisition card manufactured by Ines Company Gmbh in Germany. The data acquisition circuit can include an analog to digital (A/D) converter for converting an analog signal into digital signal data. A buffer 17 can be provided to store portions of signals from data acquisition circuit 16 (as those signals may be relatively continuous) until a filtration and signal detection can be carried out as are described further below. The processing circuitry 14 also includes a processor 18 for receiving the digital signal data from the data acquisition circuit 16 and buffer 17 and performing various signal processing functions on the digital signal data to detect the occurrence of an initiating action and determine the type of initiating action. The system 10 also includes an output peripheral 20 coupled to the processor 18 for executing one or more control instructions provided by the processor 18 which correspond to the initiating action. One skilled in the art will recognize that, depending on the application, the analog to digital converter function and the buffering function can be omitted or performed by software.

Figure 1B:
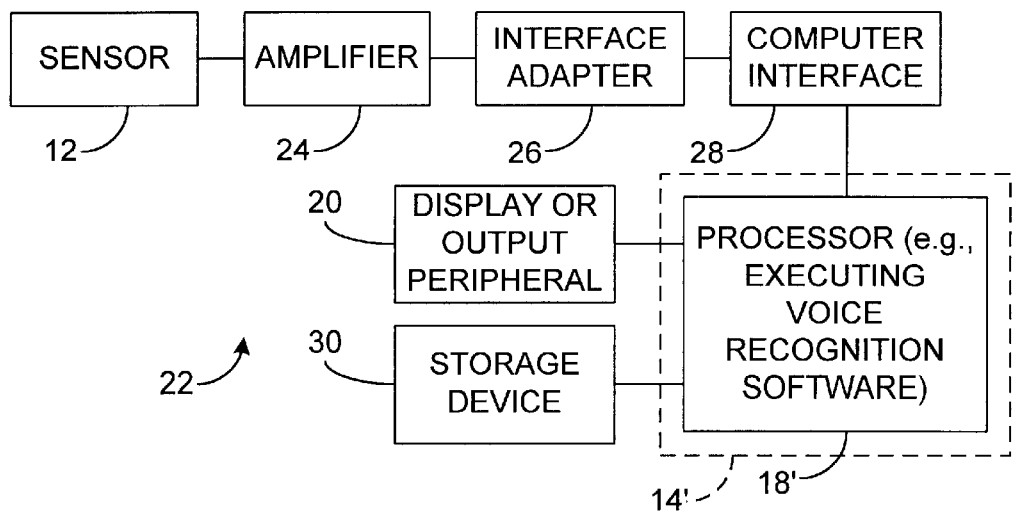
FIG. 1B is a block level diagram illustrating a system by which air pressure fluctuations are detected and processed, and in the illustrated embodiment, processed by a voice recognition software program to interpret speech of a person.

FIG. 1B is a block level diagram which illustrates another embodiment of a system 22 for detecting initiating actions and providing an output which corresponds to the detected action. The system 22 includes the sensor 12 having an internal microphone (described in greater detail below). The electrical signal produced by the sensor 12 is optionally amplified with an amplifier 24. However, in some applications, the amplifier 24 is not needed depending on the equipment receiving and processing the electrical signal output by the sensor 12.

The electrical signal is then received by an interface adapter 26. The interface adapter 26 can be a mechanical connection such as an electrical connector to be received by a corresponding jack on the device which ultimately receives and processes the electrical signal output by the sensor 12. The interface adapter 26 can also include more complex instrumentation, such as a universal serial bus (USB) adapter. As one skilled in the art will appreciate, depending on the processor, device or application receiving the electrical signal produced by the sensor 12, the interface adapter 26 is optional or can be any device for establishing physical and/or logical connection between the sensor 12 and the device to receive the electrical signal produced by the sensor 12.

The electrical signal is then received by a computer interface 28. The computer interface 28, as with the amplifier 24 and the interface adapter 226, is optional depending on the configuration of the system 22. The computer interface 28 can be a mechanical connection such as a jack or receptacle, or can be more complex instrumentation, such as a sound board for a computer. In one embodiment, the amplifier 24 and/or the interface adapter 26 are omitted and the signal produced by the sensor 12 is input to processing circuitry 14' via a conventional computer sound board, the sound board being used to convert the analog signal produced by the sensor 12 into a digital signal.

The electrical signal is then processed by processing circuitry 14'. The processing circuitry 14' can take on the form of the processing circuitry 14 illustrated in FIG. 1A and can optionally include such devices such as an analog to digital converter, a buffer, and/or a processor 18'. The processor 18' can be configured to execute logic for a variety of applications that make use of the signal generated by the sensor 12.

In the illustrated embodiment, the processor 18' is programmed to execute a voice recognition software program. As is known in the art, voice recognition software converts spoken language into text which can be electronically manipulated such as with a word processing program. The text can be output to an output peripheral 20. For example, the text can be displayed on a display or printed by a printer. The text can also be stored for later retrieval by a storage device 30 on a computer-readable medium including, but not limited to, magnetic and optical storage devices. Alternatively, the electrical signal itself or recognized speech derived therefrom can be used to control machinery such as a self-powered wheelchair, a robotic arm, a computer, transportation vehicles, domestic and industrial appliances or machinery, and the like.

Figure 1C:
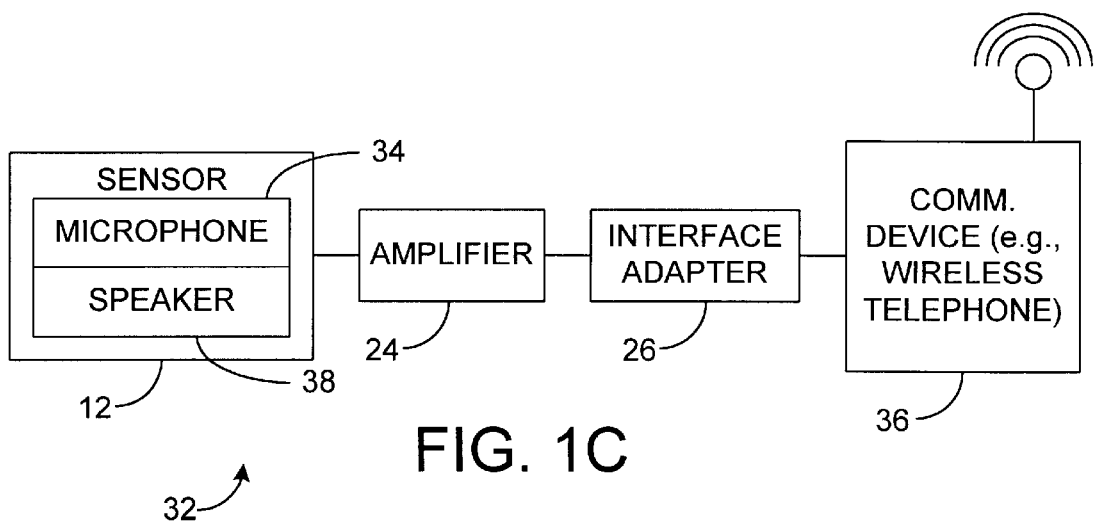
FIG. 1C is a block level diagram illustrating a system by which air pressure fluctuations are detected and re-transmitted by a communications device.

FIG. 1C is a block level diagram which illustrates a system 32 for detecting initiating actions and providing an output which corresponds to the detected action. The system 32 includes the sensor 12 having at least an internal microphone 34. The sensor 12 and internal microphone 24 will be described in more detail below. The sensor 12 outputs an electrical signal which is optionally amplified by amplifier 24. Next, the electrical signal is received by a communication device 36 via an appropriate interface adapter 26, if needed. The communications device can be, for example, a telephone which is either hard-wired to a telephone system or, as shown in the illustrated embodiment, is a wireless telephone such as a cellular phone. Alternatively, the communications device 36 can be a radio, portable computing device, or the like. In one embodiment, the signal generated by the sensor 12 is input into a personal computer, personal digital assistant (PDA) or the like and is transmitted to another location or device via a network (e.g., a LAN, a WAN, the Internet, etc.). In another arrangements, the communications device can be replaced with other types of devices such as a recorder for recording the user's speech for later retrieval or an amplification system for broadcasting the speech to a live audience.

In addition, the sensor 12 can include a speaker 38 used to transmit (i.e., broadcast) sounds to the user. In this way, the sensor 12 and communication device 34 can be used as a bidirectional communication apparatus.

Figure 1D:
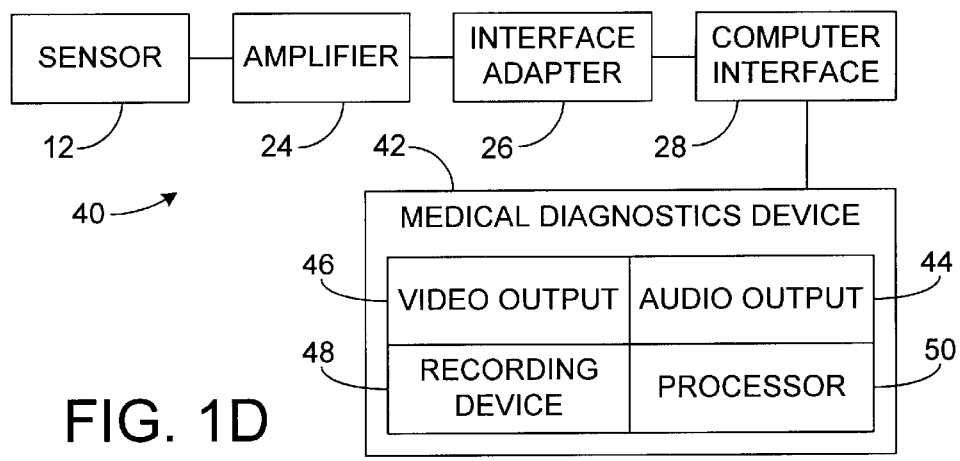
FIG. 1D is a bock level diagram illustrating a system by which air pressure fluctuations are detected and used by a medical diagnostics device.

FIG. 1D is a block level diagram which illustrates a system 40 for detecting initiating actions and providing an output which corresponds to the detected action. The system 40 includes the sensor 12, which preferably includes the internal microphone 34 (FIG. 2B) described in more detail below. The sensor 12 is connected to a medical diagnostics device 42 via, if desired, an amplifier 24, interface adapter 26 and computer interface 28. The medical diagnostics device 42 has an audio output 44 (e.g., speaker, stethoscope attachment, etc.) so that detections of air pressure by the sensor 12 corresponding to biological processes (heart beat, breath sounds, gastronomic sounds, etc.) of a patient can be heard and studied by medical personnel. To help the medical personnel listen to the biological processes, the medical diagnostics device can optionally include filters (in hardware or software) to isolate these sounds before broadcasting the sounds to the medical personnel. In another embodiment, the medical diagnostics device 42 has a video output 46 (e.g., an LCD or CRT screen) to display a video representation of the detected air pressure changes. For instance, the sound generated by the heart within the patient's ear and detected by the sensor 12 can be converted into a graph (e.g., amplitude versus time) and displayed on the video output 46 in similar fashion to display of an electrocardiogram.

The medical diagnostics device 42 can also include a recording device 48 (e.g., a digital or analog data storage medium) to store detections of the patient's biological processes. The recorded sounds can be compared to subsequent detections. This comparison can be made by a person or by software programmed to isolate differences between the first and second detections.

The medical diagnostics device 42 can also include a processor 50 which executes programmed logic (e.g., software) to analyze the detected air pressure changes. The software can be programmed to search the signal produced by the sensor for patterns, irregularities (including those normally undetectable by a human), differences from a baseline detection and so forth.

In addition, data acquired by the medical diagnostics device 42 from the sensor 12, or data calculated by the medical diagnostics device 42, can be transmitted to other locations. For example, the medical diagnostics device 42 can be placed in an ambulance and transmit information about a patient to a destination hospital. As an alternative example, the data could be gathered by one medical worker and transmitted to another medical worker, such as a specialist located in another city.

In another embodiment, the sensor can be located remotely from the medical diagnostic device 42. For example, a person could use the sensor 12 from a location such as his/her home. The information detected by the sensor 12 could then be transmitted to a remote medical diagnostics device 42. The transmission could be carried out over a telephone or other communications device as discussed above with respect to the system 32 illustrated in FIG. 1C. Alternatively, the signal generated by the sensor 12 can be input to a personal computer, a PDA or the like and transmitted to the medical diagnostics device 42 via a network (e.g., a LAN, a WAN, the Internet, etc.).

Figure 1E:
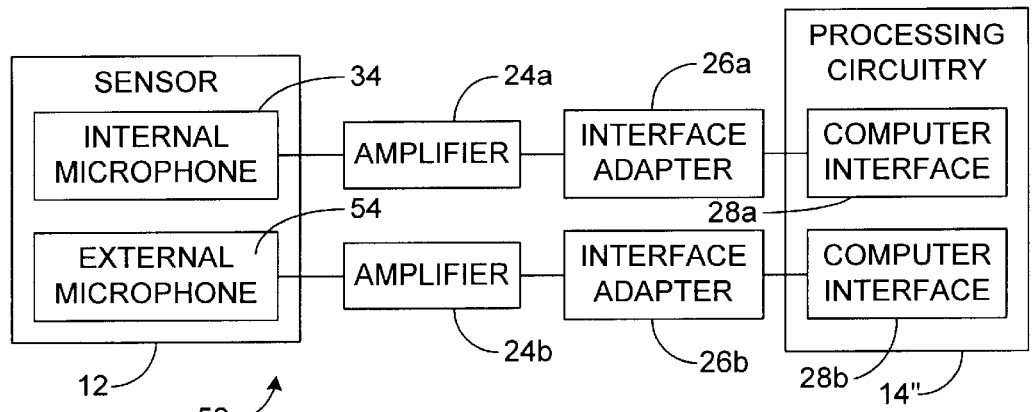
FIG. 1E is a block diagram illustrating a system having a sensor with an internal microphone and an external microphone.

FIG. 1E is a block diagram which illustrates a system 52 for detecting initiating actions and providing an output which corresponds to the detected action. The system 52 includes the sensor 12, preferably having the internal sensor 34. In the illustrated embodiment of the sensor 12, the sensor 13 has an additional pressure detector, or external microphone 54. The use of the external microphone 54 is optional. As will be described in more detail with respect to FIG. 2B below, the internal microphone 34 is disposed on a housing 150 (FIG. 2B) to be inserted at least part way into the ear of a person. That is, the internal microphone 34 is insert at least into a cavity defined by an external portion of the ear (described below in more detail with respect to FIG. 2A). As a result, the internal microphone 34 detects air pressure changes located within the ear. These air pressure changes are the result of initiating actions and, in part, to externally generated sound, such as other people's speech, environmental noise and the like. The external microphone 54 is disposed on the housing 150 (FIG. 2B) and generally points away from the person wearing the sensor 12. As a result, the external microphone 54 detects air pressure changes located outside the ear. These air pressure changes are the result of externally generated noise (other people's speech, environmental noise, etc.) and, in part, to initiating actions of the person wearing the sensor 12 and particularly the speech of that person.

The internal microphone 34 is connected to processing circuitry 14" or another device used to receive the electrical signals respectively produced by the microphones 34 and 54 in response to sensed air pressure changes. Each microphone 34 and 54 is connected to the processing circuitry 14" using separate and distinct inputs, or channels. In one embodiment, the internal microphone 34 is connected to the left channel input of a computer sound card, or computer interface 28a, via an amplifier 24a and an interface adapter 26a. The external microphone 54 is connected to the right channel input of the computer sound card, or computer interface 28b, via an amplifier 24b and an interface adapter 26b.

The processing of the unique signals generated by the microphones 34 and 54 will be described in more detail below with respect to FIG. 3B. The unique signals can be used to distinguish between user produced initiating actions and externally produced sounds. In alternative configurations of the system 52, the system 52 can be adapted to cancel externally generated noise from the detections of the internal microphone 34.

Testing has shown that when the user speaks (or produces an air pressure change in the ear from another type of initiating action), the strength of the signal generated by the internal microphone 34 corresponding to the speech (or initiating action) is usually stronger than the strength of the signal generated by the external microphone 54 that corresponds to the same speech (or initiating action). Testing has also shown that when a sound is generated by a source other than the user (e.g., another person speaking), the strength of the signal generated by the external microphone 54 corresponding to the sound is usually stronger than the strength of the signal generated by the internal microphone 34 that corresponds to the sound. These sound energy differentials, or relative signal strengths, can be used to determine whether the source of the detected air pressure change is from the user or external to the user.

For instance, if the user is speaking, the internal microphone 34 may detect the user's speech and external noise (e.g., the hum of an air conditioner and a computer). In this example, the external microphone 54 may detect the user's speech, but to a smaller degree than the internal microphone 34. The external microphone 54 will also detect external noise and that external noise will be detected to a larger degree by the external microphone 54 than by the internal microphone 34. Accordingly, the processing circuitry 14" can be programmed to compare the signals and discern that the source of the speech is from the user. In addition, the processing circuitry 14" can be programmed to isolate the user's speech by comparing the two signals to identify the speech component and the noise component. As a result, a relatively noise-free speech signal can be produced which can be used in connection with voice recognition software as indicated above. In alternative embodiments, the foregoing technique can be used to distinguish between the user's speech and another individual's speech. Both person's speech can then be analyzed as desired. As one skilled in the art will appreciate, the foregoing technique can be applied to the detection of other type of initiating actions, including thoughts, movements related to the oral cavity, biological processes and the like.

Figure 2A:
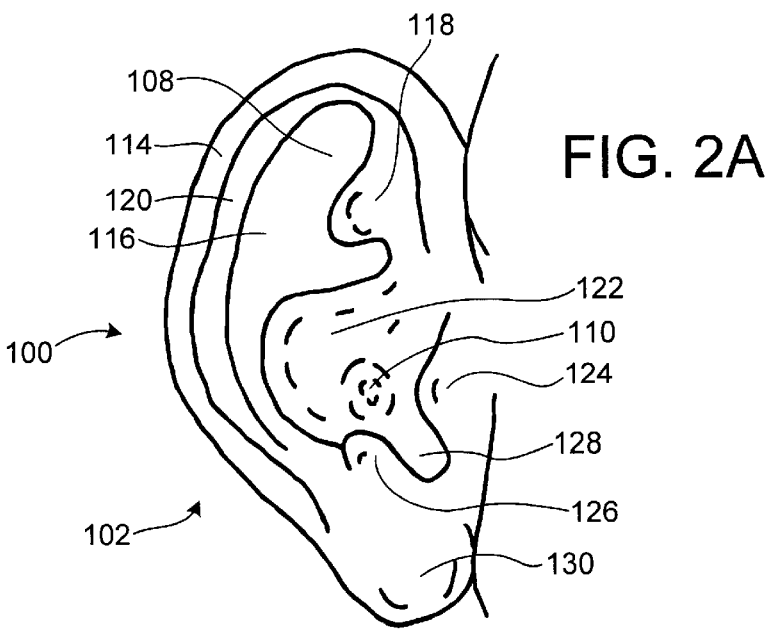
FIG. 2A is a schematic view of an ear.
Figure 2B:
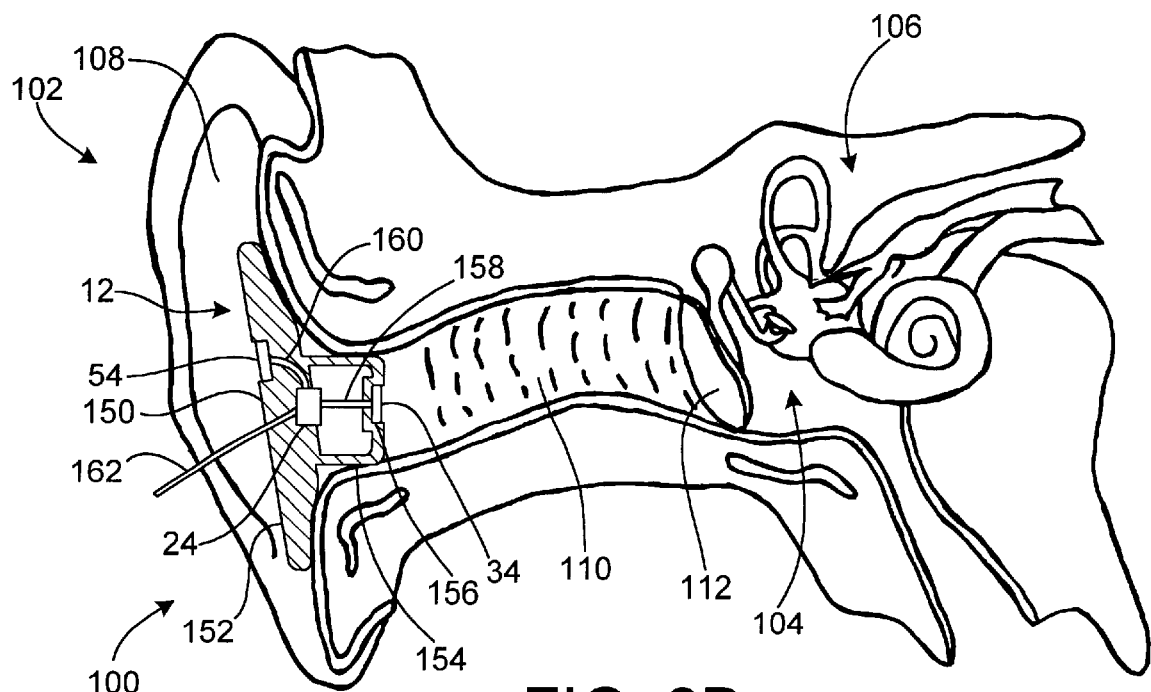
FIG. 2B is a cross-sectional view of a sensor embodiment for monitoring air pressure changes within the ear of a person.

Referring to FIGS. 2A and 2B, an external view and a cross-sectional view of an ear 100 are respectively illustrated. FIG. 2B also shows the sensor 12 in cross-section. According to Henry Gray's famous text "Anatomy", the human ear is divided into three parts, including the external ear 102, the middle ear (or tympanum) 104 and the internal ear (or labyrinth) 106. The middle ear 104 and the internal ear 106 will not be described in great detail herein. The external ear 102 includes an expanded portion, or a pinna 108 (also referred to as an auricle), and an ear canal 110 (also referred to as a meatus or auditory canal). The pinna 108 serves to collect vibrations of the air surrounding the person's head. The ear canal 110 conducts those vibrations to the tympanum, or ear drum 112.

The pinna 108 has a generally ovoid form with a larger end directed upward and having an outer surface that is irregularly concave and directed slightly forward. The pinna 108 has a number of eminences and depressions. Typically, the ear 100 has a prominent and curved rim, or helix 114. Generally parallel to the helix 114 is another curved prominence, or antihelix 116. The antihelix 116 bifrucates to form a triangular depression, or a fossa of the antihelix 118 (also referred to as a fossa triangularis). A narrow, curved depression located between the helix 114 and antihelix 116 is referred to as fossa of the helix, or scapha 120. The antihelix 116 also curves around a deep, capacious cavity, or the concha 122 (the concha 122 being divided by the commencement of the helix 114, or crus helicis, into an upper part, termed the cymba conchae, and a lower part, termed the cavum conchae). The concha 122 leads inward to an opening of the ear canal 110. In front of the concha 122 and projecting backward (usually over the opening of the ear canal 110) is a pointed eminence, or tragus 124. Opposite the tragus 124 is a tubercle, or antitragus 126. A notch-like depression, or incisura intertragica 128, is disposed between the tragus 124 and antitragus 126. A lobule 130 is present under the tragus 124 and antitragus 126.

The ear canal 110 is an oval cylindrical passage extending from a bottom of the concha 122 to the ear drum 112. The ear canal 110 is about an inch and a half in length when measured from the tragus 124 to the ear drum 112. When measured from the bottom of the concha 122 to the ear drum 112, the ear canal is about an inch long. The ear canal 110 forms a gradual "S-shaped" curve and is directed, at first, inward, forward and slightly upward (i.e., pars externa). The ear canal 110 then passes inward and backward (i.e., pars media) and then passes inward, forward and slightly downward (i.e., pars interna).

It is not certain what physical, chemical or neural mechanism causes or generates the changes in air pressure in or near the ear in response to various initiating actions. However, due to the connection of the oral cavity to the ear via the eustachian tube, movements and speech may cause an air pressure, a change in air pressure or an air flow to or from the ear leading to a detectable air pressure which can be detected by the sensor 12. Regardless of the exact physical, chemical or neural mechanism, empirical testing has confirmed that initiating actions described herein generate pressure changes in or near the ear of the person and that the air pressure changes have substantially their own signature and are thus substantially unique for a given initiating action of an individual. Consequently, the air pressure changes can be monitored near the ear and used to detect the initiating action of a user.

The present invention uses various forms of the terms "changes in air pressure" and "changes within the ear" in their broadest sense to characterize the parameter being measured. Changes in air pressure may alternatively be characterized as sound waves. These sound waves (or vibrations) may propagate through mediums other than air, such as bone and tissue. As is well known by those skilled in the art, as a sound wave spreads out from its source its intensity falls off (the energy per unit area decreases with the inverse square of the distance), but the total energy is constant. Consequently, it is desirable to have the microphone 34 sufficiently close to the source of the sound wave so that the intensity level of the detected changes will be as large as possible.

The frequency range at which sound waves are audible by humans is about 20 Hz to about 20 KHz, however, the present invention is not concerned with whether the changes within the ear are audible since the microphone 34 is selected to be sufficiently sensitive and to have a frequency detection range which is sufficient to detect air pressure changes at high or low frequencies. Therefore, any frequency range may be monitored which is suitable to detect initiating action (e.g., about 10 Hz to about 20 KHz) and such variations are contemplated as failing within the scope of the present invention.

It has been found that many initiating actions (including, for example, thoughts and tongue movements) generate air pressure changes having a frequency in the range of about 10 Hz to about 300 Hz. Other initiating actions, such as speaking and biological processes, generate air pressure changes in the range of about 20 Hz to about 20 KHz. Also, it is noted here again that the reference to detecting air pressure may mean detecting air pressure, a difference in air pressure and/or a sound. In addition, some initiating actions, such as movements of the tongue, can produce a detectable pressure wave that has a strength corresponding to the direction, speed and/or intensity of the movement. Although the invention may use a single sensor 12 in one ear 100, two sensors 12 (one in each ear 100) can be used to obtain additional information whereby each sensor 12 detects different information and/or cumulative information, which can be correlated by the processor.

FIG. 26 illustrates the sensor 12 inserted at least partially into the ear 100 of a person (i.e., at least within the cavity defined by the pinna 108, if not deeper within the ear 1000 such as within the concha 122, at the opening of the ear canal 110 or slightly into the ear canal 110). The sensor 12 includes a housing 150, the internal microphone 34 and, optionally, an external microphone 54. In the illustrated embodiment the housing 150 has an exterior portion 152 and an interior portion 154. The housing 150, however, can take on a number of different configurations. The housing preferably resembles the housing of a hearing aid and particularly a digital hearing aid for similar insertion, or partial insertion, into the ear 100 and/or ear canal 110. The exterior portion 152 is optional. The illustrated external portion 152 is made from a material such as plastic and is wider than an opening of the ear canal 110 to engage the pinna 108 or, alternatively, to engage the ear 100 to cover the whole pinna 108 (e.g., similar to that of a common headphone assembly). In one embodiment, the external portion 152 fits within the concha 122 and is retained, at least in part, by the tragus 124 and/or the antitragus 126. Such arrangement at least partially insulates the interior microphone 34 from externally generated noise and air pressure changes.

The interior portion 154 can be made from a pliable material, such as rubber, and is sized and shaped to snugly fit within the ear 100. Such material is sometimes referred to in the art as being "soft-solid." Optionally, the entire housing 150, or portions thereof, can be made of pliable material, sound absorbing (or sound proofing) material and/or include sound insulating material such as foam.

The internal microphone 34 is disposed on the interior portion 154 of the housing 150. Accordingly, the interior portion 154 is sized and shaped to position the internal microphone 34 with respect tot he ear 100 and/or ear canal 100 as desired. On one embodiment, the interior portion 154 positions the internal microphone 34 in the concha 122. In another embodiment, the interior portion 154 positions the internal microphone 34 at the opening of the ear canal 110 where the ear canal 110 meets the concha 122. It should be appreciated that the interior portion 154 and/or internal microphone 34 need not enter the ear canal 110. In yet another embodiment, and as illustrated by example in FIG. 2B, the interior portion 154 positions the internal microphone 154 within the ear canal 110. When positioned within the ear canal 110, the internal microphone 34 enters the ear canal 110 at a depth of about one tenth of an inch to about a half of an inch measured from the opening of the ear canal 110.

The housing 150, including both the exterior portion 152 and the interior portion 154, can be custom designed for the individual to form a close and comfortable fit with the ear of the individual. Alternatively, the housing can have a standard design for all individuals which is fabricated in a number of sizes. As one skilled in the art will appreciate, many alternative configurations for the housing 150 are possible and each are considered to fall within the scope of the present invention.

The interior portion 154 of the housing 150 has a recess 156 in which the microphone 34 is placed. Preferably, the air adjacent the ear drum 112 and/or the air in the ear canal 110 will be in fluid communication with the air adjacent the microphone 34. In this way, sounds or air pressure changes generated within the ear 100 will be transmitted directly to the microphone 34 through an air medium. In one embodiment, the microphone 34 is held in place with an adhesive. The microphone 34 in one embodiment is about one mm to about six mm in diameter. One skilled in the art, however, will appreciate that the microphone 34 is not necessarily round. In an alternative embodiment, the microphone 34 is disposed within a hollow cavity defined by the housing 150 and an opening in a wall of the internal portion 154 of the housing 150 is provided to establish fluid communication of the air inside the housing 150 and the air inside the ear canal 110.

By inserting the microphone 34 in the ear 100 and/or ear canal 110, the microphone 34 is shielded from environmental noise. More specifically, the housing 150 and the head of the user at least partially blocks externally generated sound waves before reaching the microphone 34.

In one embodiment, the microphone 34 is a directional microphone adapted to detect air pressure changes from a particular direction. The directional microphone is aimed as desired to detect various different air pressure changes generated by different type of initiating actions. For example, the microphone can be aimed towards a desired source, such as the ear drum 112, the ear canal 110 wall, or the bone structure surrounding the opening of the ear canal 110. Since the microphone is directional, the microphone will detect less environmental noise (the source of that noise is outside the ear and from a direction which does not typically coincide with the directional sensitivity of the microphone). In other embodiments of the present invention, the microphone 34 is a noise canceling microphone to further reduce the detection of environmental noise.

It should be appreciated that the microphone 34 can be moved closer to or further away from various anatomical structures within the ear 100 as desired for factors such as comfort, detection of certain air pressure changes caused by a specific type of initiating action, and the like.

The microphones 34 and 54 can take on a number of different forms, such as a silicon or semiconductor microphone (also referred to as a pressure sensor) such as the devices disclosed in U.S. Pat. Nos. 4,533,795, 4,922,471, and 6,156,585, each of which are incorporated herein by reference in their entireties. It is noted that the foregoing devices are exemplary and other electroacoustic transducers from a number of different vendors can be used.

In the illustrated embodiment, when the sensor 12 is inserted into the ear 100, a slight positive pressure is created by compression of the air within the ear canal 110. It is believed that this slight positive pressure, which is undetectable to the individual, improves the overall operating characteristics and sensitivity of the sensor 12.

The microphone 34 is capable of detecting various forms of initiating action, including, for example, the speech of a person speaking at a variety of volumes, physical movements of the person such as clicking the person's tongue against the roof of the person's mouth, opening the person's jaw, the person's breathing, the person's heartbeat, etc. In addition, pressure changes in the ear caused by thoughts can be discerned by detecting the changes within the ear when a trained individual thinks a thought.

It has been shown that the use of one sensor 12 with only the internal microphone 34 (i.e., without an external microphone 54) in one of the ears 100 of an individual can be used to detect the initiating actions described herein. However, empirical testing has shown that by using two such sensors 12, one in each of the ears of an individual, the performance of systems such as the systems 10, 22, 32, 40 and 52 improves by about six times due to the detection of more information. It is noted that in certain circumstances, the use of a sensor 12 in both ears is discouraged (such as when using a cellular telephone while driving a car). It is noted that the processing and logic routines described herein can be modified to process signals from a second sensor 12 (the sensors 12 with or without an external microphone 54). Such modifications will be apparent to one of ordinary skill in the art.

Although not illustrated in FIG. 2B, a speaker 38 (FIG. 1C) can be placed on or within the housing 150 of the sensor 12 to transmit sounds to the individual. For example, when using the sensor 150 as a microphone for a communications device 36, the sensor 12 can also be used to broadcast received sounds to the user.

As indicated, the sensor 12 can also include the external microphone 54. The external microphone 54 is disposed on the exterior portion 152 of the housing 150 and is pointed away from the wearer of the sensor 12 assembly. The external microphone 54 can be secured to the housing 150 with adhesive and can be disposed in a recesses defined by the exterior portion 152. Similar to the internal microphone 34, the external microphone 54 is small (e.g., about one mm to about six mm, but need not be round).

The position of the external microphone 54 allows the external microphone 54 to detect air pressure changes present near the wearer's ear but have a source external to the wearer of the sensor 12. In one embodiment, the external microphone 54 can optionally be a noise canceling microphone as is known in the art.

The internal microphone 34 is electrically coupled to the amplifier 24 with a conductor 158 and the exterior microphone 54 is electrically coupled to the amplifier 24 with a conductor 160. Although illustrated as a single unit in FIG. 2B, the amplifier 24 contains separate amplifying circuitry 24a and 24b (FIG. 1E) for each signal respectively generated by the internal microphone 34 and the external microphone 54. The amplifier 24 is electrically coupled to the interface adapter 26 (not shown in FIG. 2B) with a conductor 162. More specifically, the conductor 162 carries the amplified signals from the microphones 34 and 54 separately to separate interface adapters 26a and 26b. As one skilled in the art will appreciate, if the amplifier 24 is omitted the microphones 34 and 54 will be coupled directly to the interface adapter(s) 26 by way of a conductor or conductors. It is also noted that if two sensors 12 are used by placing one sensor 12 in each ear 100 of a person, the processing circuitry or other device receiving signals from the sensors 12 will receive four signals corresponding respectively to the internal microphone 34 and the external microphone 54 of each sensor 12.

Figure 2C:
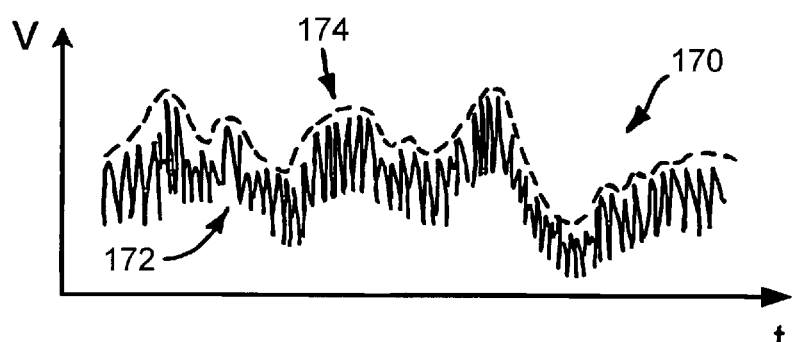
FIG. 2C is a graph illustrating an exemplary electrical signal produced by a sensor according to the present invention.

The microphones 34 and 54 of the sensor 12 monitor the changes in air pressure and convert the pressure changes to an analog electrical signal 170, as illustrated in FIG. 2C. In the signal 170 there are at least two signal components, a high frequency component 172 and a low frequency component 174. In addition, other frequencies may also exist within the electrical signal 170 and the present invention can be adapted to analyze the various signal frequencies, as described herein.

In an alternative embodiment, the internal microphone 34 and the external microphone 54 are mounted to a headphone style assembly having a band disposed around the user's head and hubs disposed over one or both ears 100 of the user. One exemplary headphone and internal microphone assembly which may be used is the Model 4190 microphone manufactured by Brüel & Kjaer in Denmark.

Figure 3A:
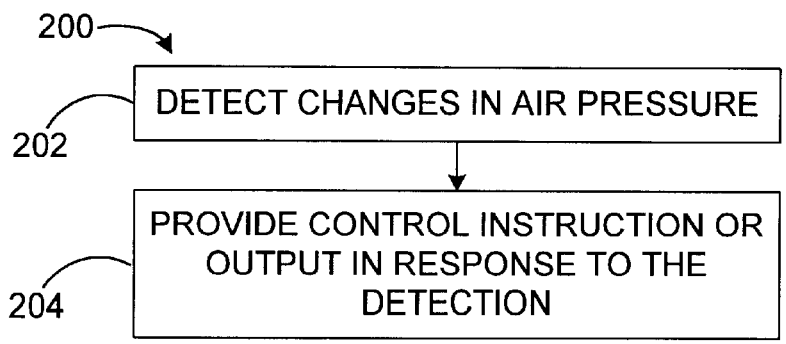
FIG. 3A is a flow chart diagram illustrating a method of detecting changes in air pressure and providing a control instruction in response to the detected changes according to the present invention.

A method 200 for carrying out the present invention is disclosed in FIG. 3A. The method 200 includes detecting an initiating action by monitoring a change in the ear 100 at step 202 with the internal microphone 34 of the sensor 12. The external microphone 54 is optional in carrying out the method 200. Once the initiating action is detected at step 202, one or more control instructions or other output(s) which correspond to the detected initiating action is provided at step 204 to effectuate the desired output function.

Figure 3B:
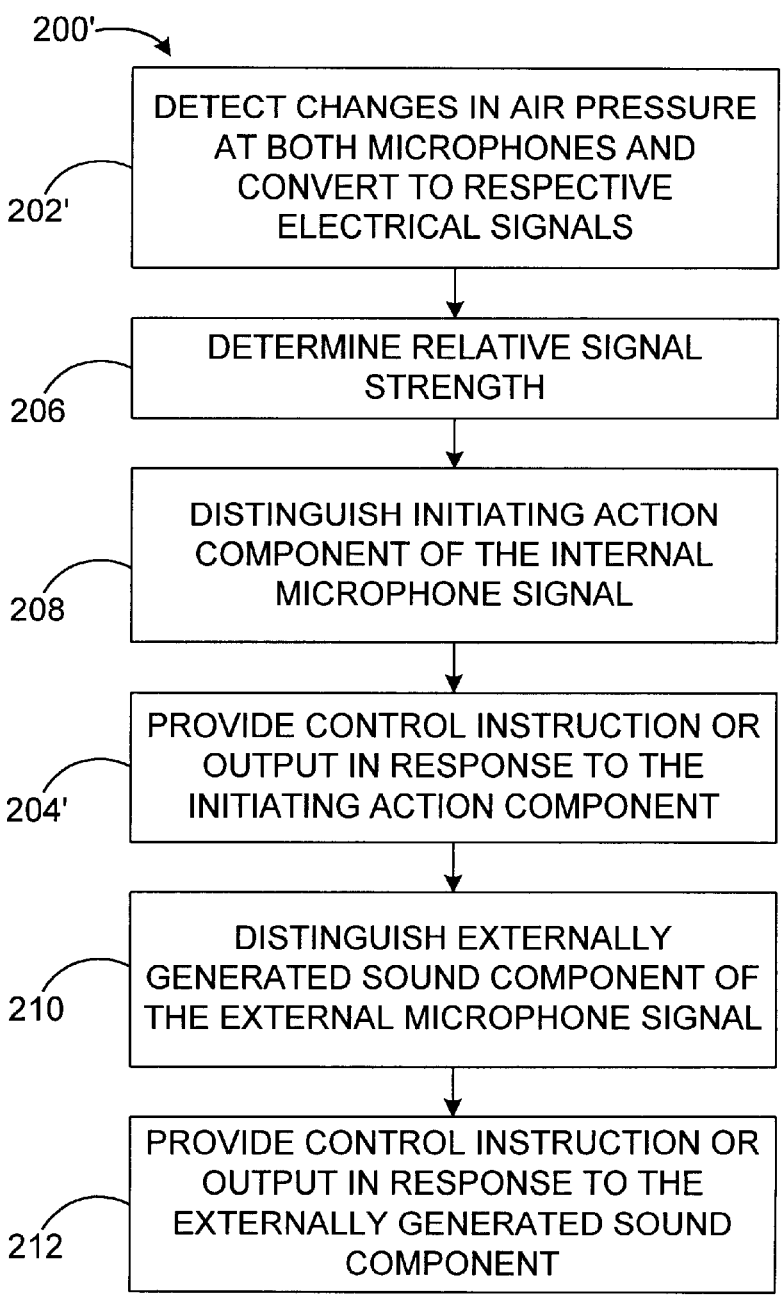
FIG. 3B is a flow chart diagram illustrating another method of detecting changes in air pressure and providing a control instruction in response to the detected changes according to the present invention.

A method 200' for carrying out the present invention is disclosed in FIG. 3B. The method 200' includes the detection of changes in air pressure with both the internal microphone 34 and the external microphone 54. More specifically, in step 202', changes in air pressure within the ear 100 and/or ear canal 110 are detected by the internal microphone 34. These detections can be the result of an initiating action, but can also include a sound component generated external to the person wearing the sensor 12 and/or a sound component generated by speech of the wearer and traveling from the wearer's mouth, through the air and to the wearer's ear 100 area. Also in step 202', changes in air pressure near, but outside, the ear 100 of the person wearing the sensor 12 are detected by the external microphone 54. These detections are mainly the result of sounds generated external to the person wearing the sensor 12 and/or a sound component generated by speech of the wearer and traveling from the wearer's mouth, through the air and to the wearer's ear 100 area. The detections are converted by the microphones 34 and 54 into respective electrical signals, herein referred to as an internal signal and an external signal.

Next, in step 206, the internal signal and the external signal are compared. When the user speaks or produces an air pressure change in the ear 100 from another type of initiating action, the strength of the signal generated by the internal microphone 34 corresponding to the initiating action is usually stronger than the strength of the corresponding signal generated by the external microphone 54. Testing has also shown that when a sound is generated by a source other than the user (e.g., another person speaking), the strength of the signal generated by the external microphone 54 corresponding to the sound is usually stronger than the strength of the corresponding signal generated by the internal microphone 34.

Using the signal strength differential, the source of the detected air pressure changes (i.e., from the user or external to the user) can be reliably determined. From further comparison of the internal signal and the external signal, two components from each signal are derived. The two components for each signal include a component relating to air pressure changes caused by the initiating action and a component relating to externally generated noise and/or sound, which may or may not include speech of the user detected by the external microphone 54 depending on the system in which the sensor 12 is being used. It is noted that for initiating actions other than speech, the initiating action component of the external signal may be nearly undetectable.

Subsequent processing of the internal signal and external signal will depend on the system in which the sensor 12 is being used and which types of initiating actions are being detecting. For example, the signals can be used by the processor or other device receiving the signals to invoke a corresponding output signal or signals. However, in most applications, it will be advantageous to isolate the component of the internal signal generated by the initiating action and, if desired, eliminate to the fullest extent possible any externally generated component of the internal signal. Therefore, in step 208, the method 200' distinguishes the initiating action component of the internal microphone signal. In another embodiment of step 208, the method 200' can cancel noise (or all sounds) detected by the external microphone 54 from the detections of the internal microphone 34. More specifically, the externally generated component of internal signal is filtered from or mathematically removed from the internal signal. The resulting signal from step 208 is used in step 204' to provide the control instruction or output response appropriate for the initiating action.

Similar processing to process the external signal can be carried out in step 210 to derive a signal of externally generated sounds, such as a to isolate another person's speech from noise and from speech of a person wearing the sensor 12. Thereafter, in step 212, a control instruction or output response appropriate for the externally generated sound can be produced.

Figure 4:
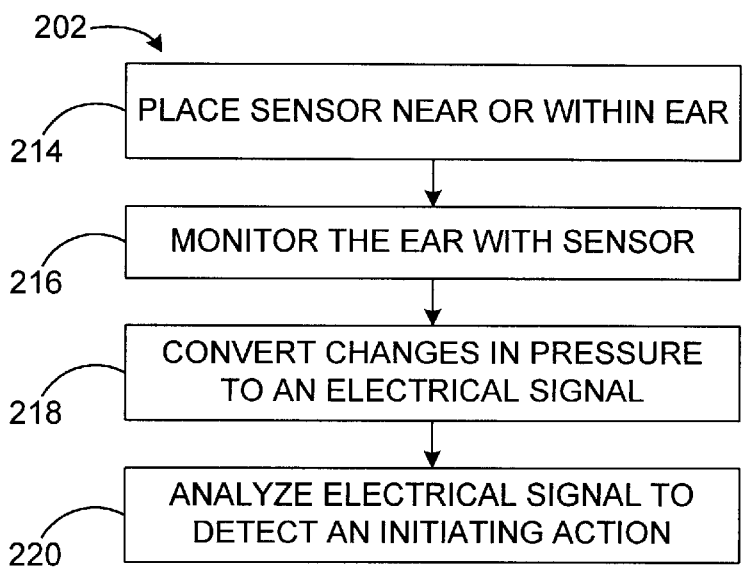
FIG. 4 is a flow chart diagram illustrating a method of monitoring according to the present invention.

A method of detecting changes in the ear 100 (step 202) is illustrated in FIG. 4. The microphone 34 is placed in the ear 100 of the user who's initiating actions are to be detected at step 214. However, initiating actions may result in changes at or near other parts of the body. Therefore, it is contemplated that in alternative embodiments of the present invention, the sensor 12 may be located on, in or near other parts of the body and any detection of initiating actions by analyzing physiological or air pressure changes is contemplated as falling within the scope of the present invention.

The changes in the ear 100 are monitored with the microphone 34 at step 216 and are converted to an electrical signal at step 218 for subsequent analysis. After conversion into an electrical signal at step 218, the electrical signal is analyzed to detect the initiating action at step 220. Although it is conceivable that the initiating action may be detected at step 220 simply by analyzing the signal corresponding to changes in air pressure or changes in the ear 100 without additional data processing, step 220 typically includes data processing in conjunction with the signal analysis. It is noted that when a sensor is used which has an external microphone 54, then the foregoing logic can be modified to include the capture of an electrical signal corresponding to air pressure changes outside the ear 100 and using that signal in the analysis of step 220 as described above.

Figure 5:
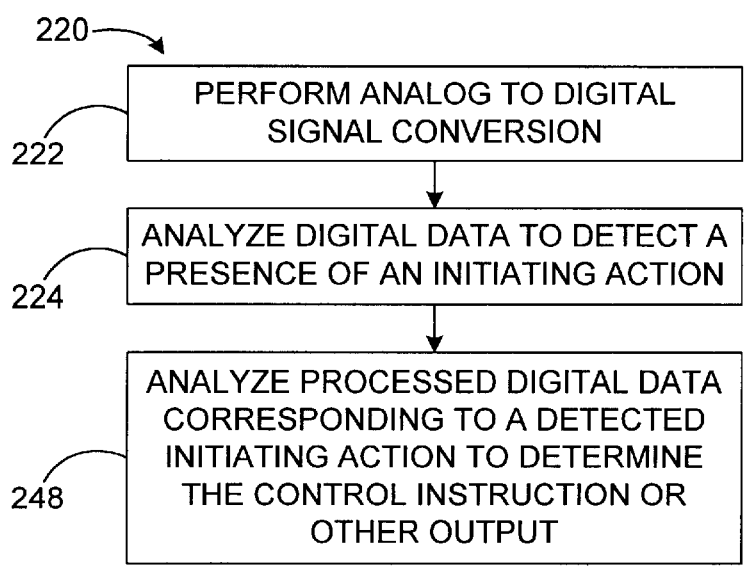
FIG. 5 is a flow chart diagram illustrating a method of processing an electrical signal corresponding to a mouth/tongue action, a thought, speech and/or another type of initiating action.
Figure 6:
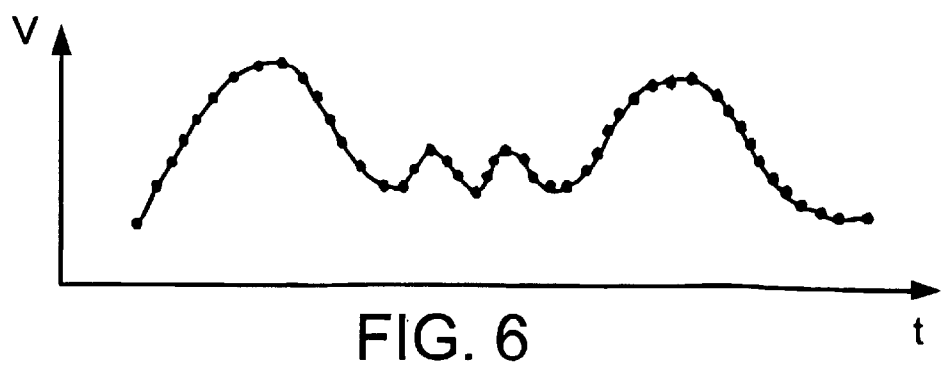
FIG. 6 is a graph illustrating the conversion of an analog electrical signal to digital signal data according to the present invention.

An exemplary method of analyzing and processing the electrical signal which corresponds to the monitored pressure (step 220) is illustrated in FIG. 5. Again, the analyzing logic can be adapted as described herein to include processing of a second electrical signal derived from an external microphone 54. The analog electrical signal, an example of which is illustrated in FIG. 2C, is converted into a digital signal at step 222, as illustrated by example in FIG. 6. As is well known by those skilled in the art, an analog signal may be converted into a digital signal by sampling the analog signal at a selected frequency and identifying the signal amplitude at each sampling point. Each sampled data point is then saved as a digital word in a memory and used for further analysis. In FIG. 6, a sampled analog signal is illustrated in which the dotted line illustrates the exemplary analog signal for a particular time period and the plurality of points on the dotted line represent sampled amplitude values which are saved in the memory. It is desirable that the sampling frequency be sufficient to capture enough data points to adequately represent the analog signal. As an example, the sampling rate of the may be 32 KHz and the total signal time length to be analyzed may be 2048 mSec. Alternatively, however, other sampling rates and data acquisition time frames may be utilized and such variations are contemplated as falling within the scope of the present invention.

Figure 7:
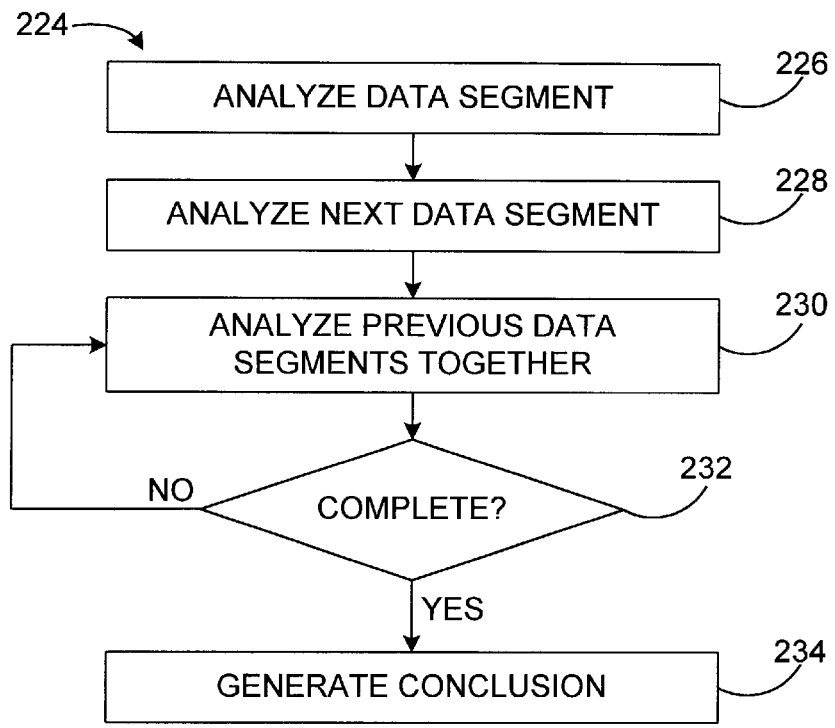
FIG. 7 is a flow chart diagram illustrating a method of analyzing the digital signal data according to the present invention.
Figure 8:
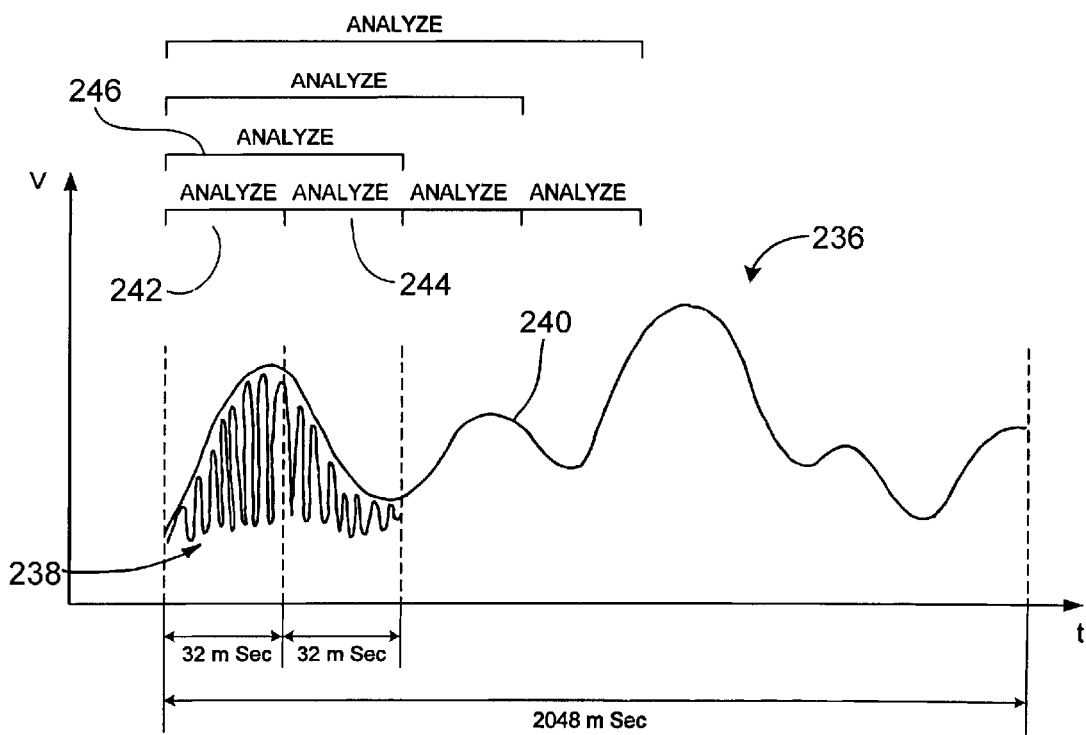
FIG. 8 is a graph illustrating a method of analyzing the digital signal data with the flow chart of FIG. 7 according to the present invention.

Once the analog signal has been converted into digital signal data at step 222, the digital data is analyzed and processed by, for example, a signal processor to detect the presence of an initiating action at step 224. As indicated above, step 224 may include comparison of the internal and external signals, and filtering or mathematical manipulation of the signals based on the comparison to isolate a desired component(s) of the detections and/or to remove an undesired component(s) of the detections. In addition, or as an alternative, the analysis and processing of the data may be performed in a plurality of segments, for example, as illustrated in FIGS. 7 and 8. As illustrated in FIG. 7, the processing of step 224 can include analysis of a first data segment in step 226, followed by the analysis of a second data segment at step 228. Once various data segments have been analyzed separately, the data segments are analyzed together at step 230. If all the data segments have not yet been analyzed at step 232, the method returns to step 228 and the next data segment is analyzed, after which all previous segments are then analyzed together at step 230. The process continues until all the data segments have been analyzed at step 232, thus allowing a conclusion to be generated using the analyzed data segments at step 234.

The data segment analysis may be seen graphically in FIG. 8, wherein digital signal data 236 is illustrated as being continuous for the sake of simplicity. The total length of data for analysis may be separated into 64 segments that are each 32 mSec in length. Note that the signal 236 contains both a high frequency component 238 and a low frequency component 240. Since data relating to an initiating action potentially may be found in either component or the initiating action data may span multiple data segments, the data segments may be analyzed separately as well as together. Thus, at step 226 of FIG. 7, the first data segment is analyzed (region 242), at step 228 the second data segment is then analyzed (region 244) and at step 230 both data segments are analyzed together (region 246). The process then continues for all the data segments; consequently, the data analysis of the present invention may analyze both the high frequency and low frequency signals to detect the initiating action.

Returning back to FIG. 5, once the data considered to be initiatory data has been found in the data signal from the sensor at step 224, subsequent analysis is performed to determine the type of initiating action at step 246. Such analysis can include feature extraction and analysis using a neural net trained to recognize respective signals/features of such signals. If the neural net determines that the signal represents an initiating action of a particular character, then it provides an output or effects the production of an output representative thereof for use as described herein. Alternatively, however, other techniques may be utilized to identify the initiating action type once the initiating action is detected and any such technique is contemplated as falling within the scope of the present invention.

Figures 9, 10:
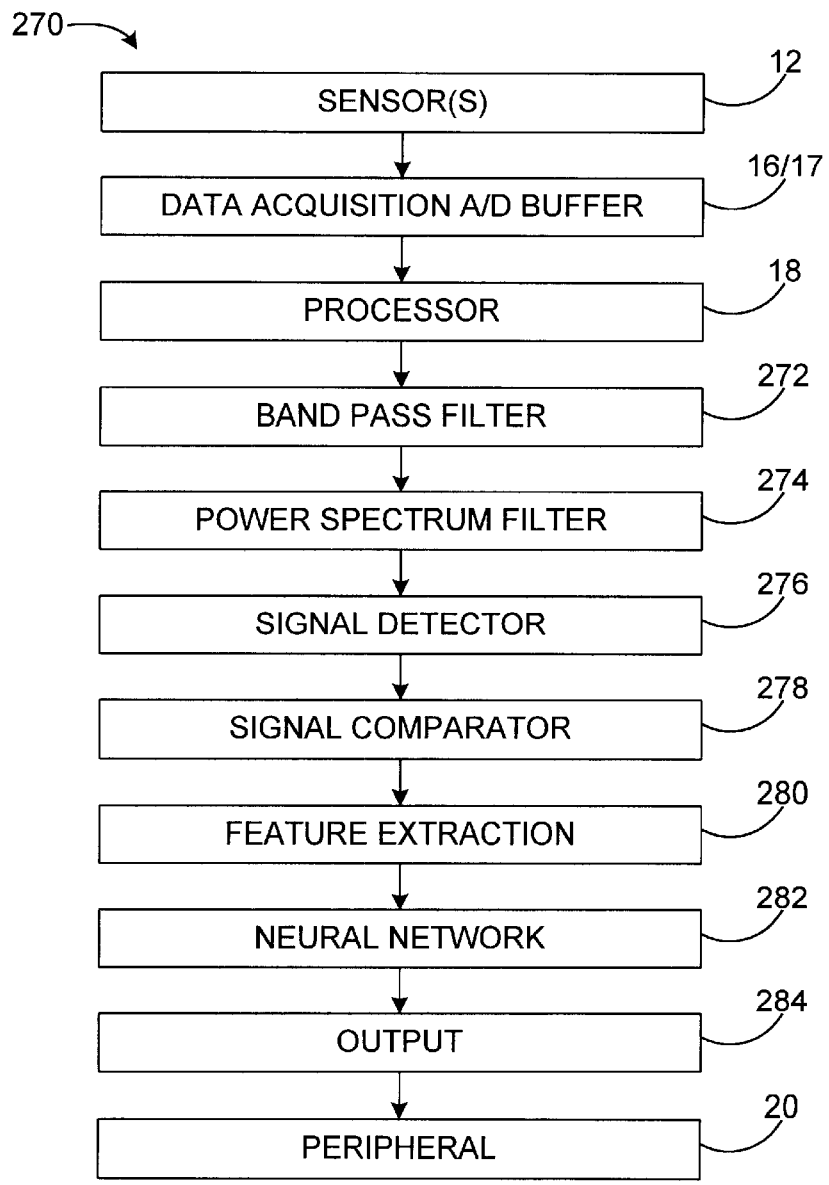
FIG. 9 is a flow chart diagram illustrating a method of processing the digital signal data according to the present invention.
FIG. 10 is a system diagram showing a system including parts and functions of the invention.

One exemplary method of analyzing the digital signal in data segments (step 224) is illustrated in FIG. 9. For each data segment of 32 mSec, the data is converted from the time domain to the frequency domain at step 250 using, for example, a Fast Fourier Transform (FFT) as is well known by those skilled in the art. As is well known, a time domain signal f(t) is linked with the frequency domain f(jω) according to the following equation:

$$F(f(t)) = \int f(t)e^{-j\omega t}dt = f(j\omega),$$

wherein F(f(t)) is a traditional Fourier transform. As is well known by those skilled in the art, a Fast Fourier Transform is related to the traditional Fourier transform since the Fast Fourier Transform is an efficient algorithm for computing discrete Fourier transforms. After the digital signal data is converted into the frequency domain via the Fast Fourier Transform, the frequency domain data is processed to distinguish data relating to initiating actions from noise data at step 252. As is well known by those skilled in the art, the separation of data from noise is often simplified in the frequency domain because unlike noise, the data signal has some physical characteristics. Though the data signal in the time domain has an amplitude which is less than the noise, the data signal has a greater amplitude than the noise in the frequency domain. Therefore the Fast Fourier Transform is a typical method for noise separation. In addition, or as an alternative, signal data from the external microphone 54 can be used to derive signal components as described in greater detail above.

The details surrounding the data processing of the digital signal data may be accomplished through a variety of data processing techniques as is well known by those skilled in the art and any data processing methodology is contemplated as falling within the scope of the present invention. Although many different data processing methodologies may be employed, an example methodology is disclosed below in conjunction with the following method and system.

Turning to FIG. 10, a system 270 and method are depicted. One or more sensors 12 sense changes in the ear(s) 100 of the user and, if desired, external to the ears(s) 100 of the user. The analog signal(s) from the sensor(s) is provided via a data acquisition card, analog to digital converter, and buffer 16/17 to the processor 18. The signal received from the sensors is substantially continuous at least over respective time periods while the initiating action is being performed; and, therefore, the buffer 17 is able to store sufficient portions of the signal for analysis by the processor 18.

In one embodiment, the processor 18 can include a band pass filter 272, power spectrum filter 274, signal detector 276, signal comparator 278, feature extraction portion 280, and neural network 282. The system 270 also includes an output 284 which may be coupled to a desired output peripheral 20.

Figure 11:
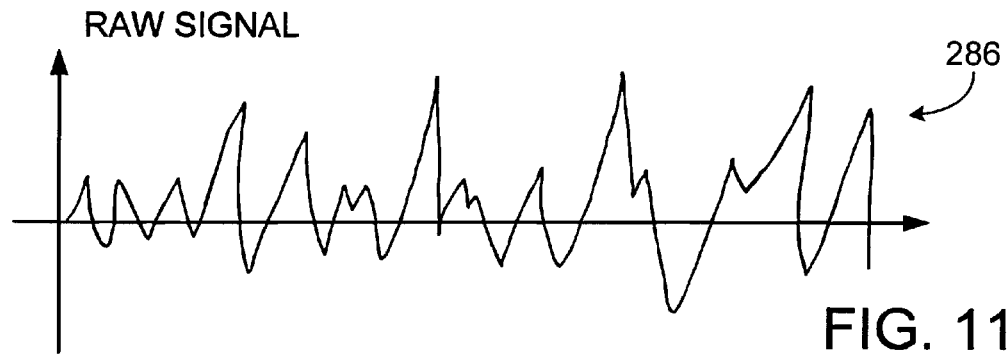
FIG. 11 is a graph representing exemplary raw signal information detected by a sensor used in the invention to detect air pressure changes.

Summarizing operation of the overall system 270, the sensor 12 and data acquisition, A/D, and buffer 16/17 supply a signal to the band pass filter 272. An example of a raw data or raw signal supplied to the band pass filter 272 is illustrated at 286 in the graph of FIG. 11. The raw signal is presented to the band pass filter and is operated on by the band pass filter in the frequency domain using fast Fourier transform techniques. The fast Fourier transform transforms the digital signal to the frequency domain. In the band pass filter frequencies that are above or below the frequency range representing initiating action, for example, are removed from the signal. The frequencies which are above and below the frequency range of interest typically are due to noise. An example of the signal after being filtered by band pass filtration is illustrated at 288 in the graph of FIG. 12. Various band pass filters may be used to provide the band pass filtration to strip from the signal frequencies above and below the desired frequency range.

Figure 12:
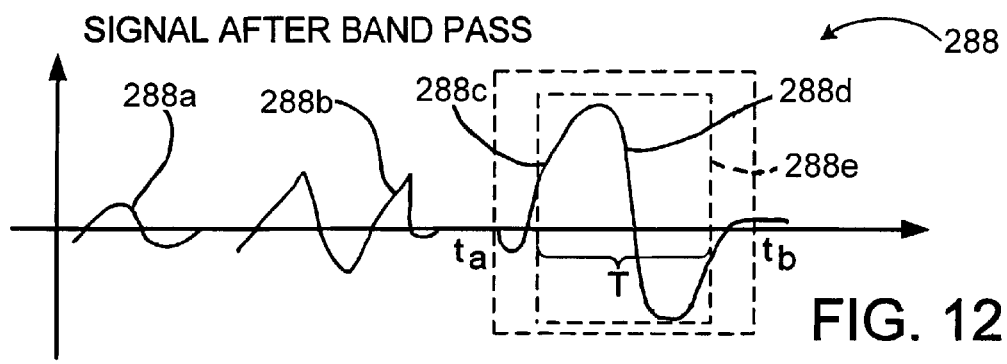
FIG. 12 is a graph of frequency filtered signal information of FIG. 11, the frequency filtering to remove noise, for example.
Figure 13:
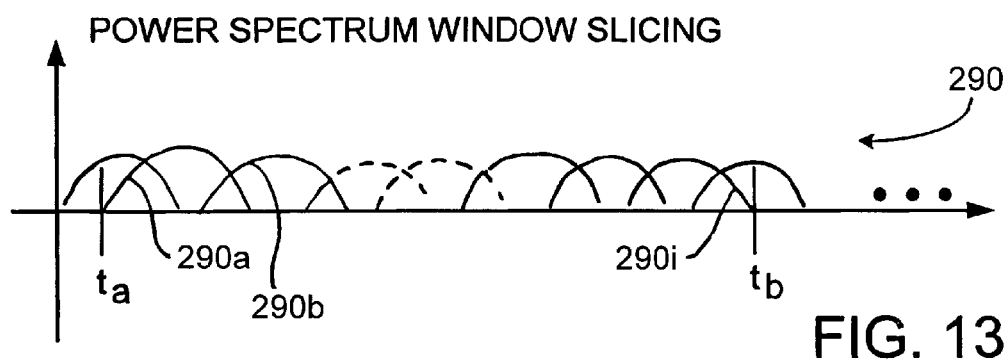
FIG. 13 is a graph representing power spectrum window slicing of the curve of FIG. 12.

Portions of the signal represented at 288, such as portions 288a and 288b may not be representative of initiating action, e.g., since they are relatively low power and, therefore, still may be noise. Therefore, the power spectrum filter 274 does a further filtration according to power of the various portions of the signal to determine portions which are due to initiating action and, accordingly, should be considered for further analysis. The power filtration may be carried out by slicing the signal of FIG. 12 to multiple windows or segments, such as those represented at 290a, 290b, . . . 290i in FIG. 13. It will be appreciated that the graph of FIGS. 12 and 13 are of different scales. Thus, the windows 290a–290i slice a time frame between times $t_a$ and $t_b$, which is the same time frame between times ta and tb illustrated for the signal portion 288c in FIG. 12.

Power filtration suppresses or eliminates those frequencies where the power of the signal does not exceed a prescribed threshold or value and, thus, likely represent noise. By eliminating those noise components the signal representing the initiating action can be found. To perform the power filtration, for example, a power spectrum for the signal is calculated using the following formula:

$$P_f = Mag_f^2 + Phase_f^2$$

where $f=F_0 \ldots F_i$, and $[F_0; F_i]$ represent the frequency range in which the signal resulting from tongue action is expected.

Figure 14:
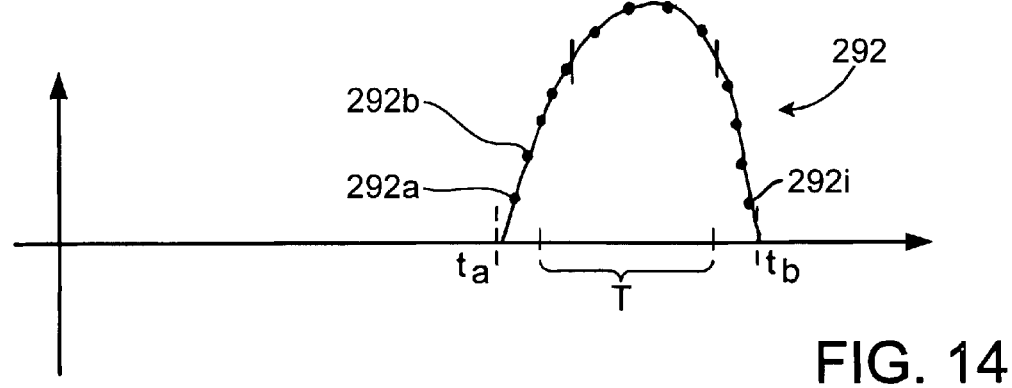
FIG. 14 is a graph of such power spectrum.

In words, the power is a function of the magnitude squared plus the phase squared. The power as calculated above for respective windows 290a, 290b . . . 290i is reconstructed to make a graph 292 shown in FIG. 14. The graph 292 shows values 292a, 292b . . . 292i from the mentioned computation. The curve 292 is relatively smooth and it represents power spectrum where a signal caused by initiating action may be found in the graph 288 of FIG. 12. Usually the signal caused by initiating action is of relatively high power and occurs in time approximately at the middle of the graph 292, e.g., over the time frame T shown in FIG. 13. It is the time at which this time frame occurs and the duration of it that detects the signal or locates when in time the signal 288 represents the initiating action. Therefore, the signal detector component 276 of the system 270 in effect is the combination of the graphs of FIGS. 12 and 13 and the analysis just described to provide the signal detection function. The time frame T also is shown in the graph of FIG. 12 and, thus designates that portion 288d (in the illustrated blocked window 288e) of the signal 288c which is to be considered produced by the initiating action.

As an alternative to, or in addition to, the filtration and detection operations of the power spectrum filter 274, the signal detector 276 and the feature extraction 278, the signal comparator 278 can carry out method 200' to produce a signal indicative of the initiating action, or signal portion 288d. The signal portion 288d or at least a feature of that signal then may be supplied to the neural network 282. Using feature extraction principles a feature of the signal portion 288d is supplied to the neural network. In the neural network 282 the feature is compared with other features on which the neural network has been trained. Training of neural networks is a well known procedure. The neural network can determine whether an input feature, such as that representative of the signal portion 288d, is an acceptable match or correlates acceptably to the training of the neural network; and, if affirmative, then the neural network causes production of the output 284. The output 284 may be an electrical signal which is analogous to the type of signal produced by a computer mouse, joystick or other device. Thus, in one example, a tongue action whereby the tongue of the user is moved from the front bottom left of the mouth to the back top right of the mouth may cause the production of an output signal analogous to a movement of a mouse from the lower left to the upper right of a mouse pad.

The feature which is extracted from the signal 288, for example, may be features which designate some characteristic or feature which differentiates the curve representing the signal from other things. Various features are used in feature extraction methods, which are well known. In the present invention an exemplary feature is the smoothed power spectrum of the signal portion 288d. Other features may be the logarithm of the power spectrum, the power spectrum itself, etc.

The neural network 282 may be a conventional neural network trained in a typical fashion. The neural network 282 can compare the feature of the signal portion 288d with its training and can determine whether the feature is more like one trained feature or another trained feature. If the input feature of signal portion 288d is sufficiently like one trained feature, then the neural network causes production of an appropriate signal at the output, as was described above, for example. If the input feature is not sufficiently like any of the trained features or is relatively similar to two or more trained features, then the neural network will not cause the output to produce an output signal, for the uncertainty may otherwise cause production of an undesirable output signal.

As was described above, if two sensors 12 are used, then the system 270 may operate sequentially on each signal from respective sensors 12 or may include parallel processing capability so that the signals from both sensors can be processed substantially simultaneously. The output 284 may reflect the results of signal analysis of the signals originating from both sensors and may be used to provide an output signal at the output 284 that reflects in effect three dimensional data.

The diagrams described herein show the architecture, functionality and operation of various systems for detecting changes within a human ear and producing an output signal or control instruction corresponding to an initiating action. Each functional block may represent a module, segment, or portion of software code that contains one or more executable instructions to implement the specified logical function(s).

Although the block diagrams and flowcharts show a specific order of execution, it is understood that the order of execution may differ from that depicted. For example, the order of execution of two or more blocks may be altered relative to the order shown. Also, two or more blocks shown in succession may be executed concurrently or with partial concurrence. In addition, various blocks may be omitted. It is understood that all such variations are within the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method of detecting an air pressure change within an ear of a person, comprising the steps of:

placing a first microphone at least partially within an ear of the person;

detecting the change in air pressure within the ear of the person using the microphone, the change in air pressure including an aspect corresponding to an initiating action made by person;

producing an electrical signal corresponding to the internally detected change in air pressure;

detecting an air pressure change adjacent and external to the ear of the person with a second microphone;

producing an electrical signal corresponding to the externally detected change in air pressure;

comparing a signal strength difference between the electrical signal corresponding to the internally detected change in air pressure and the elctrical signal corresponding to the externally detected change in air pressure to distinguish an initiating action component of each signal from an external source component of each signal; and processing the electrical signals to produce and output signal corresponding to the initiating action.

2. The method according to claim 1, wherein the first microphone is placed in a concha of the ear.

3. The method according to claim 1, wherein the first microphone is placed in an ear canal of the ear.

4. The method according to claim 1, wherein the initiating action is speech and the step of processing includes performing automated speech recognition to produce the output signal.

5. The method according to claim 1, wherein the initiating action is speech and the method further includes the step of transmitting the output signal to a remote location over a communications medium.

6. The method according to claim 1, wherein the initiating action is a thought and the output signal is a control instruction associated with the thought.

7. The method according to claim 6, further comprising the step of training a neural network to recognize a signal pattern associated with the thought and contained within at least one of the electrical signals.

8. The method according to claim 1, wherein the initiating action is a non-vocal voluntary physical movement associated with the oral cavity and the output signal is a control instruction associated with the movement.

9. The method according to claim 8, further comprising the step of training a neural network to recognize a signal pattern associated with the movement and conained within at least one of the elctrical signals.

10. The method according to claim 1, further comprising the step of removing at least an external source component of the electrical signal corresponding to the internally detected change in air pressure.

11. A detection system, comprising:

a housing positionable with respect to an ear of a person;

a first microphone disposed with respect to the housing for insertion into the ear of a person, the microphone operable to detect a change in air pressure within the ear while the person makes an initiating action and to produce an electrical signal corresponding to the internally detected change in air pressure;

a second microphone disposed with respect ot the housing and located adjacent to the ear and operable to detect a chnage in air pressure external to the ear of the person and to produce an elctrical signal corresponding to the externally detected change in air pressure; and processing circuitry that executes logic to compare a signal strength difference between the electrical signal corresponding to the internally detected change in air pressure and the electrical signal corresponding to the externally detected change in air pressure to distinguish an initiating action component of each signal from an external source component of each signal and the processing circuitry coupled to the microphone for processing the processing the processes the elctrial signals to produce an output signal corresponding to the initiating action.

12. The system according to claim 11, wherein the first microphone is disposed for placement in a concha of the ear.

13. The method according to claim 11, wherein the first microphone is disposed for placement in an ear canal of the ear.

14. A speech recognition system according to claim 11, wherein the initiating action is speech and the processing circuitry executes logic to perform automated speech recognition to produce the output signal.

15. A communication system according to claim 11, wherein the initiating action is speech and the system includes a communications device for transmitting the output signal to a remote location.

16. The system according to claim 11, wherein the initiating action is a thought and the processing circuitry executes logic to recognize the thought from the electrical signals and the output signal is a control instruction for controlling a computing device or item of machinery.

17. The system according to claim 16, wherein the recogniton logic includes neural network matching logic.

18. The system according to claim 11, wherein the initiating action is a non-vocal voluntary physical movement associated with the oral cavity and the processing circuitry executes logic to recognize the movement from the electrical signals and the output signal is a control instruction for controlling a computing device or item of machinery.

19. The system according to claim 18, wherein the recognition logic includes neural network matching logic.

20. The system according to claim 11, wherein the processing circuitry executes logic to remove at least an external source component of the electrical signal corresponding to the internally detected change in air pressure.

* * * * *

UNITED STATES PATENT AND TRADEMARK OFFICE
CERTIFICATE OF CORRECTION

PATENT NO. : 6,647,368 B2
DATED : November 11, 2003
INVENTOR(S) : Nemirovski

It is certified that error appears in the above-identified patent and that said Letters Patent is hereby corrected as shown below:

Column 11,
Line 44, replace "failing" with -- falling --
Line 63, replace "FIG. 26" with -- FIG. 2B --

Column 20,
Line 64, replace "elctrical" with -- electrical --

Column 21,
Line 37, replace "conained" with -- contained --
Line 38, replace "elctrical" with -- electrical --

Column 22,
Line 1, replace "ot" with -- to --
Line 2, replace "adjacent to the ear" with -- adjacent the ear --
Line 3, replace "chnage" with -- change --
Line 4, replace "elctrical" with -- electrical --
Lines 14 - 16, replace "processing circuitry coupled to the microphone for processing the processing the processes the elctrial" with -- processing circuitry processes the electrical --

Signed and Sealed this

Twenty-sixth Day of October, 2004

JON W. DUDAS
*Director of the United States Patent and Trademark Office*